United States Patent
Cameron

(10) Patent No.: US 9,851,159 B2
(45) Date of Patent: Dec. 26, 2017

(54) CURVED CROSS-FLOW HEAT EXCHANGER

(71) Applicant: HS Marston Aerospace Limited, Fordhouses, Wolverhampton (GB)

(72) Inventor: Sean L. Cameron, Wolverhampton (GB)

(73) Assignee: HS MARSTON AEROSPACE LIMITED, Wolverhampton (GB)

( * ) Notice: Subject to any disclaimer, the term of this patent is extended or adjusted under 35 U.S.C. 154(b) by 159 days.

(21) Appl. No.: 14/657,280

(22) Filed: Mar. 13, 2015

(65) Prior Publication Data

US 2015/0260459 A1 Sep. 17, 2015

(30) Foreign Application Priority Data

Mar. 13, 2014 (GB) .................................. 1404441.6

(51) Int. Cl.
*F28D 7/02* (2006.01)
*F28F 3/02* (2006.01)
(Continued)

(52) U.S. Cl.
CPC ............ *F28F 3/022* (2013.01); *F28D 9/0031* (2013.01); *F28F 13/06* (2013.01); *B23P 15/26* (2013.01); *Y10T 29/4935* (2015.01)

(58) Field of Classification Search
CPC .. F28F 3/022; F28F 13/06; F28F 3/005; F28F 3/08; F28F 3/02; F28F 3/083;
(Continued)

(56) References Cited

U.S. PATENT DOCUMENTS 3,444,925 A * 5/1969 Johnson ................ B22F 3/1115
165/10
4,434,845 A * 3/1984 Steeb .................... F28D 9/0062
165/153
(Continued)

FOREIGN PATENT DOCUMENTS

EP 2474803 A2 7/2012
EP 2636982 A2 9/2013
(Continued)

OTHER PUBLICATIONS

Curved Heat Exchanger from Lytron (available prior to Mar. 13, 2014), [retrieved on Mar. 13, 2015] http://www.lytron.com/~/media/Images/Lytron/Heat%20Exchangers/Custom%20Heat%20 . . . .
(Continued)

*Primary Examiner* — Justin Jonaitis
(74) *Attorney, Agent, or Firm* — Cantor Colburn LLP

(57) ABSTRACT

A curved cross-flow heat exchanger including a first flow path for a first fluid stream which is arranged substantially at right angles to a second flow path for a second fluid stream, wherein: the first flow path is confined within one or more heat exchanger sections that bridge between opposite sides of the heat exchanger, the one or more heat exchanger sections having a leading edge positioned in the second flow path, wherein each of the one or more heat exchanger sections is a curved laminated heat exchanger section and comprises a leading edge that is curved in a direction normal to the second flow path.

13 Claims, 6 Drawing Sheets

(51) Int. Cl.
*F28F 13/06* (2006.01)
*F28D 9/00* (2006.01)
*B23P 15/26* (2006.01)

(58) Field of Classification Search
CPC ........ F28D 9/0031; F28D 9/00; F28D 1/0308;
F28D 9/0006; F28D 9/0025; F28D
9/0037; F28D 9/0062; F28D 9/0081;
Y10T 29/4935; B23P 15/26
USPC .................................................. 165/165, 166
See application file for complete search history.

(56) References Cited

U.S. PATENT DOCUMENTS

| 4,473,111 | A | * | 9/1984 | Steeb | ............ | F28D 9/0062 |
| | | | | | | 165/153 |
| 4,505,419 | A | * | 3/1985 | Steeb | ............ | B23K 1/0014 |
| | | | | | | 228/183 |
| 4,617,072 | A | * | 10/1986 | Merz | ............ | B32B 3/20 |
| | | | | | | 156/89.25 |
| 5,040,596 | A | * | 8/1991 | Terasaki | ............ | F28D 9/0062 |
| | | | | | | 165/166 |
| 2010/0314008 | A1 | | 12/2010 | Epshteyn et al. | | |

FOREIGN PATENT DOCUMENTS

| GB | 2089692 A | 6/1982 |
| JP | S6213993 A | 1/1987 |

OTHER PUBLICATIONS

GB Search Report for Application No. GB1404441.6, dated Sep. 26, 2014, 3 Pages.

HS Marston-Heat Transfer, Oct. 10, 2013 (Oct. 10, 2013) [retrieved on Oct. 10, 2013]. Retrieved from the internet:,URL:http://www.hsmarston.co.uk/products-1.html.

* cited by examiner

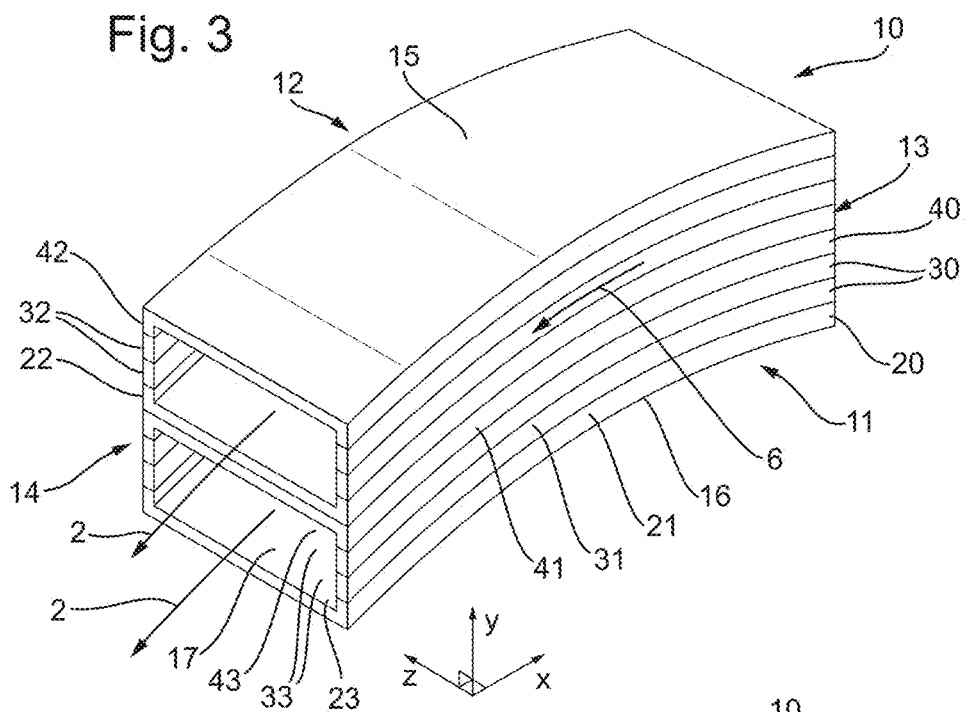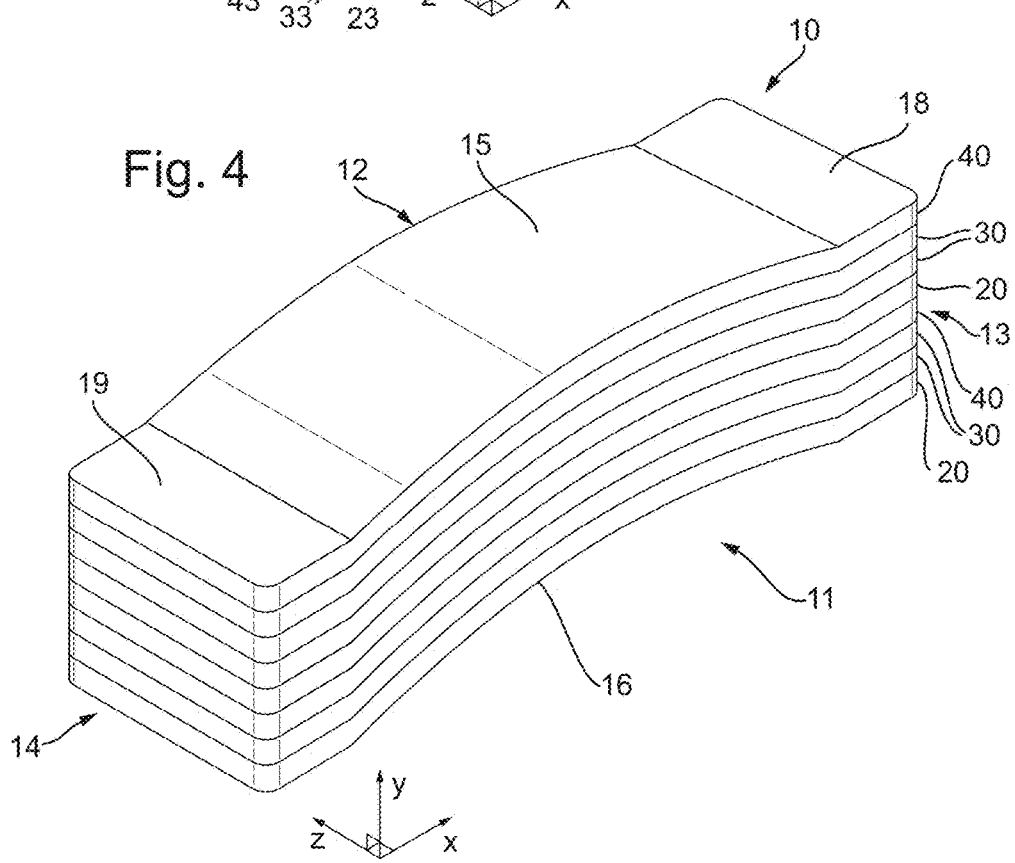

CURVED CROSS-FLOW HEAT EXCHANGER

CROSS REFERENCE TO RELATED APPLICATIONS

This application claims priority to GB Patent Application No. 1404441.6 filed Mar. 13, 2014, the entire contents of which is incorporated herein by reference.

TECHNICAL FIELD

The present specification relates to a curved cross-flow heat exchanger comprising a first flow path for a first fluid stream which is arranged substantially at right angles to a second flow path for a second fluid stream. It also relates to a method of manufacturing a curved cross-flow heat exchanger.

BACKGROUND

In gas turbine engines, especially those used in aerospace applications, it is desirable to optimise the use of any available space, particularly where efficiency, volume reduction and weight reduction are primary considerations. In many cases, such as in an air-intake of an aircraft, the space available for a heat exchanger is curved.

Previously, a curved heat exchanger has been achieved by providing a plurality of cuboid-shaped heat exchanger cores connected together with wedge portions located between each core. The wedge portions provide manifolds to direct fluid from one core to the next and to ensure that adjacent cores are angled with respect to one another, thus providing the heat-exchanger with an overall curved shape. However, these wedge portions do not contribute to the heat exchanger performance.

Another curved heat exchanger has been achieved using a continuously curved core of a plate design. While the design avoids the need for wedge portions, the nature of a plate heat exchanger can present limitations on the performance. To try to maximise heat transfer, formations are required within the flow paths but these are restricted to serrated or turbulator type fins. These realistically limit the unit type to being an air-liquid or liquid-liquid due to the poor air performance for this type of fin. Further, because of the curved shape, the serrated or turbulator fins have to be oriented normal to the overall flow direction which can compromise performance. The curved plate heat exchangers must also be fabricated using a salt bath braze joining process.

Laminated heat exchangers are also known, and an example is described in EP-A-2474803. These comprise a plurality of planar (i.e. non-curved) laminate members that are stacked on top of one another to define a plurality of internal channels. The channels are formed by hollows provided in pairs of laminate members. Sets of such laminate members, each defining either part of a first flow path for a first fluid stream or a second flow path for a second fluid stream, are stacked alternately to produce the heat exchanger. A three dimensional laminated structure is thus built up from the laminated members, and within this structure there are arranged the plurality of channels for the first and second fluid streams. The resulting stack of laminate members defining the interleaved flow paths, is then brazed together to form a laminated heat exchanger.

SUMMARY

The present disclosure provides a curved cross-flow heat exchanger comprising a first flow path for a first fluid stream arranged substantially at right angles to a second flow path for a second fluid stream. The first flow path is confined within one or more heat exchanger sections that bridge between opposite sides of the heat exchanger. The or each heat exchanger section has a leading edge positioned in the second flow path. Moreover the heat exchanger section is a curved laminated heat exchanger section and it comprises a leading edge that is curved in a direction normal to the second flow path.

Accordingly, the cross-flow heat exchanger has a curved profile and can be fitted within a curved space envelope (while avoiding the need for wedge portions).

The second flow path may extend either side of the curved laminated heat exchanger section. Where more than one of the curved laminated heat exchanger sections are present, spaces between the sections will, in part, define passages for the second fluid stream, allowing the second fluid stream to pass through the cross-flow heat exchanger between the heat exchanger sections and substantially at right angles to the first fluid stream. Adjacent curved laminated heat exchanger sections may be spaced in a substantially radial direction.

An inlet (or inlets) for the first flow path may be provided at one side of the heat exchanger and an outlet (or outlets) may be provided at the other side, so that there is an overall flow direction from one side of the heat exchanger to the other. The first flow path may follow the curve of the laminated heat exchanger section directly from one side to the other, or it may include one or more changes in direction to provide a serpentine flow path of some form. On an inlet side of the heat exchanger, a manifold may be provided to distribute a first fluid to inlets of the one or more heat exchanger sections, and on an outlet side, a manifold may be provided to collect the first fluid from outlets of the one or more heat exchanger sections.

Alternatively, an inlet (or inlets) for the first flow path may be provided on one side of the heat exchanger section and an outlet (or outlets) provided on the same side. The first fluid stream may follow a serpentine path, with the fluid passing from one side of the heat exchanger to the other and back again.

By contrast, the second flow path is directed across the first flow path. Thus the second flow path may extend from the leading edge of the heat exchanger section to a trailing edge, the second flow path passing over heat exchange surfaces on opposite faces of the heat exchanger section. One heat exchange surface of the heat exchanger section may be convex while the other is concave. Arcuate passages may be provided between neighbouring heat exchanger sections for the second fluid to flow through; the second fluid stream flowing across and between a concave heat exchange surface of one section and a concave heat exchange surface of the next.

The heat exchanger section may be of constant curvature, in a direction normal to the second flow path, from the leading edge to the trailing edge, and may have curvature only in one dimension. However, it could have curvature in two or three dimensions depending on the shape of the void which it is intended to fit within.

The leading edge may be a continuous curve, and may have a C-shape when viewed in a cross-section normal to the second flow path. However, other curved shapes are also envisaged. For example, the leading edge may have an S-shape or a more complex shape when viewed in cross section, with the corresponding heat exchange surfaces being profiled accordingly.

Each of the one or more heat exchanger sections comprises a plurality of laminate members. The laminate members may be pre-formed with a curved profile and stacked one on top of another. The laminate members may be stacked in a radial direction of the heat exchanger. Pairs of these laminate members may comprise a leading edge portion and a hollowed region. The leading edge portions of the laminate members form the leading edge of the curved laminated heat exchanger section, and pairs of opposed hollowed regions define one or more channels within the first flow path. A plurality of such channels together may define the first flow path within a heat exchanger section. These channels may extend in a generally parallel fashion within the heat exchanger section.

A laminated heat exchanger section is a heat exchanger section comprising a plurality of laminate members that are stacked on top of each other to define a channel, or more usually, a set of channels arranged within the heat exchanger section. A channel may be provided by two opposing hollowed regions of adjacent laminate members arranged facing one another, or it may be defined by more than two laminate members, e.g., with intermediate laminate members acting as spacers.

In the present disclosure the channels in the laminated heat exchanger section are for just the first fluid stream, in contrast to the arrangements shown in EP-A-2474803 where channels are provided for both fluid streams.

Thus, the laminate members can be visualised as providing 'slices' of heat exchanger in which the one or more channels have been formed, and the heat exchanger section is constructed by building up a set of such laminate members on top of each other.

Additionally heat transfer elements may be provided within the channel(s) and these may extend between the hollowed regions of pairs of laminate members. These heat transfer elements may be in the form of pegs which project between laminate members providing a cover and a base of a channel. The pegs may also be provided, in part, by an intermediate laminate member, for example as 'slices' or segments of the heat transfer elements, which are arranged to lie between corresponding elements of the pair of laminate members. The heat transfer elements may be supported with ligaments to form chains of heat transfer elements. The heat transfer elements may have a round, oval, teardrop or other shape, in order to enhance performance and the removal of heat from the first fluid stream.

By using laminate members, the heat exchanger section can be formed by depositing pre-formed, curved laminate members, one on top of another. The laminate members may also have sufficient flexibility to allow them to be formed into a curve when stacked on top of one another, during the assembly process. In either case, it can allow a degree of curvature in one or more directions to be accommodated by the laminate members.

The second flow path may comprise formations, e.g., in the form of fins, extending from or between the heat exchange surfaces of the heat exchanger section(s), to improve the transfer of heat to the second fluid stream. Where there are two or more heat exchanger sections then such formations may extend between opposed surfaces of adjacent heat exchanger sections, e.g. between a concave heat exchange surface of one and a convex heat exchange surface of the next. The formations may comprise corrugated fins, e.g., in a sinusoidal or saw-tooth form, or may comprise other fin like elements. Alternatively, the formations may comprise a metal foam or a lattice having passages that allow the second fluid to flow through.

The first fluid stream may be a gas, for example, air, and the second fluid stream may also be a gas, e.g. air. Alternatively, the first fluid stream may be a liquid, for example, oil or water, and the second fluid stream may be a gas (e.g. air).

The present disclosure also provides a method of manufacturing a curved cross-flow heat exchanger comprising a first flow path for a first fluid stream which is arranged substantially at right angles to a second flow path for a second fluid stream, the method comprising: producing a plurality of laminate members; assembling the plurality of laminate members into a stack to form a curved laminated heat exchanger section for the first fluid stream; arranging the curved laminated heat exchanger section between opposite sides of the cross-flow heat exchanger to provide an assembly in which the curved laminated heat exchanger section comprises a leading edge curved in a direction normal to the second flow path; and brazing the assembly.

The method may further comprise a step of arranging another curved laminated heat exchanger section in the assembly for the first fluid stream, spaced from the first heat exchanger section, prior to the step of brazing the assembly.

Formations for transferring heat to the second fluid stream may be arranged within the assembly between the curved laminated heat exchanger sections prior to brazing the assembly. The formations destined for the second flow path may be adapted to the curvature of the curved laminated section during the assembly process.

The brazing may be a vacuum brazing technique. The brazing could also take place under a protective gas atmosphere. Such brazing techniques offer many advantages over the conventional salt bath brazing technique. However salt bath brazing may also be used where desired.

BRIEF DESCRIPTION OF DRAWINGS

Certain embodiments will now be described by way of example only and with reference to the accompanying drawings, in which

FIGS. 3, 4 and 5 show examples of a laminated heat exchanger section; and

DETAILED DESCRIPTION

Figure 1:
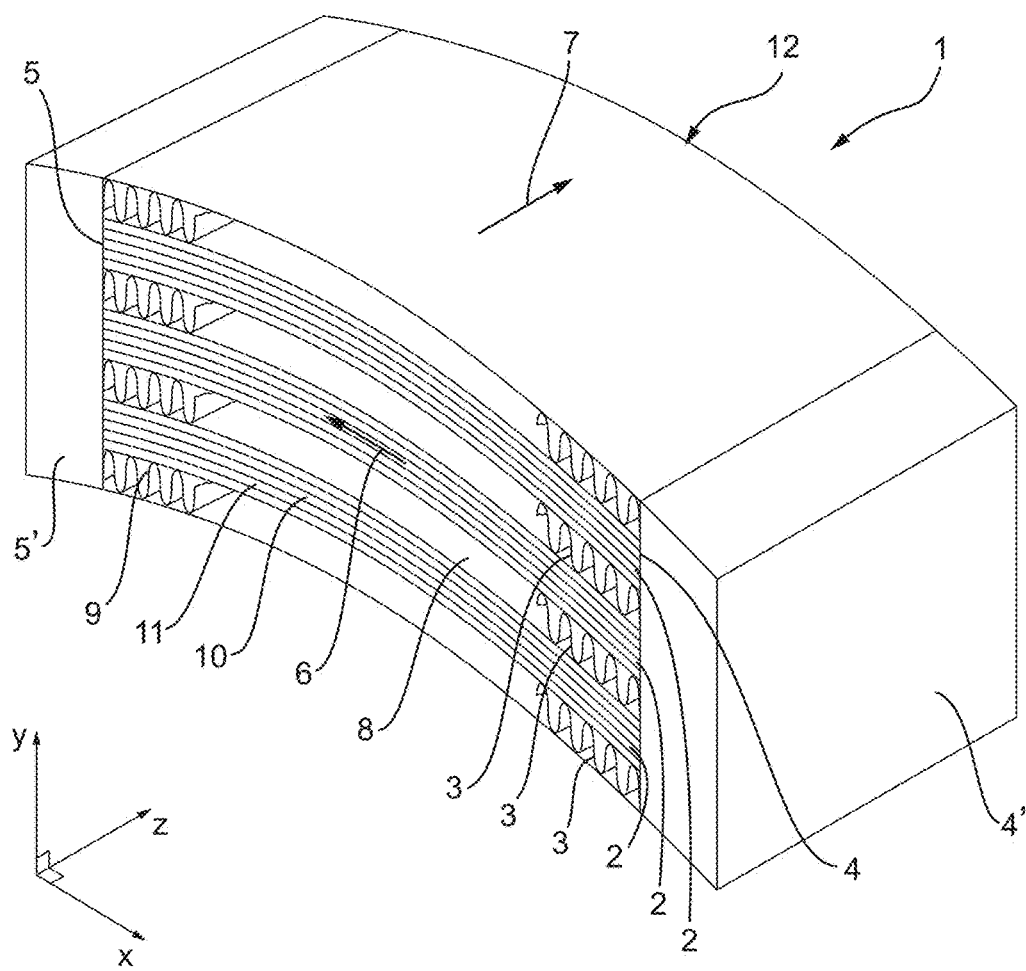
FIGS. 1 and 2 show schematic views of embodiments of a curved cross-flow heat exchanger.

Turning to FIG. 1, an exemplary curved cross-flow heat exchanger 1 is shown comprising a first flow path 2 for a first fluid stream, which is arranged substantially at right angles to a second flow path 3 for a second fluid stream. The first flow path 2 is confined within a plurality of curved laminated heat exchanger sections 10 (three are shown in the figure by way of example), each bridging between opposite sides 4, 5 of the heat exchanger 1. The second flow path 3 passes between the curved laminated heat exchanger sections 10. As can be seen in the figure, the leading edge 11 of each heat exchanger section 10 is curved in a direction normal to the second flow path 3. The spaced leading edges 11 define intakes 8 for the second fluid stream to enter the heat exchanger 1 and pass over the one or more heat exchanger sections containing the first fluid stream.

The first flow path 2 may comprise one or more channels within each heat exchanger section 10, and each channel may have an inlet at one side 4 and an outlet at the other side 5. The fluid may flow in a continuous direction within the channels from one side to the other. A manifold 4' on one side 4 may distribute the fluid to the inlets, and a manifold 5' on the other side 5 may collect the fluid from the outlets.

Figure 2:
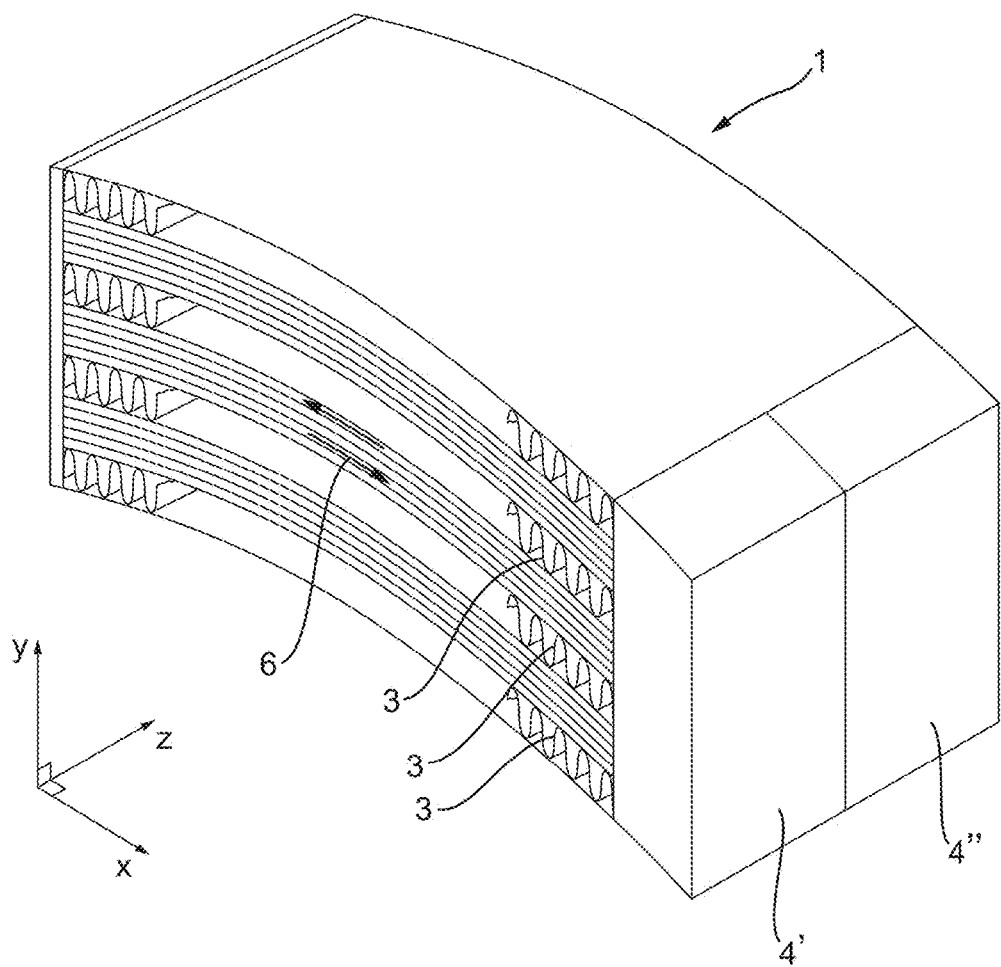

Alternatively, as shown in FIG. 2, the fluid can flow along a serpentine path from one side 4 to the other side 5 and back again. A manifold comprising two chambers 4', 4" may be provided as shown on just one side of the heat exchanger 4 to distribute the fluid to the inlets and collect it from the outlets.

The first flow path may serpentine in the thickness direction of the heat exchanger sections 10 (normal to the second flow path 3 and in the direction of the indicated y-axis) or in the depth direction (in the direction 7 of the second flow path 3 and in the direction of the indicated z-axis). In both scenarios, in FIGS. 1 and 2 the first flow path 2 will still have an overall direction from right to left in the figure (or vice versa) which we will refer to as the overall flow direction 6.

The overall flow direction 6 may be substantially perpendicular to a radial direction of curvature of the heat exchanger section 10. The thickness direction of the heat exchanger section 10 may be substantially radial, i.e. the curvature may also be considered to be in the thickness direction of the heat exchanger section 10.

The curved laminated heat exchanger sections 10 each have a trailing edge 12 on a far side of the heat exchanger 1. The second flow path 3 in each case extends in the direction of arrow 7 from the intakes 8 at the leading edges 11, across opposed heat exchange surfaces 15, 16 to the trailing edge 12. This second fluid stream 7 is substantially at 90° to the overall flow direction 6 of the first flow path 2, i.e., it is a cross-flow. In a situation where formations are present to deflect the second fluid stream locally as it flows over the heat exchange surfaces 15, 16, the direction of the second fluid stream 7 is its direction immediately before it enters the heat exchanger.

The leading and trailing edges 11, 12, and the sides 4, 5 of the cross-flow heat exchanger 1 may be oriented approximately at 90° to each other to define an approximate arcuate box shape that the second flow path 7 flows through. A cowling may be provided around the heat exchanger (not shown).

In FIG. 1 the curved laminated heat exchanger section 1 is of constant curvature (in a direction normal to the second flow path) from the leading edge 11 to the trailing edge 12. Thus it has curvature in only one dimension. It is also shown continuously curved along the entirety of the leading edge 11 (the leading edge 11 is C-shaped when viewed in a cross-section with the section taken normal to the second flow path 3).

The second flow path 3 may also comprise formations 9 extending between adjacent curved heat exchange surfaces 15, 16 of the laminated heat exchanger sections 10. The formations 9 increase the transfer of heat from the first fluid (which is confined within the curved laminated heat exchanger sections 10) to the second fluid. These formations 9 may comprise corrugated fins having valleys and ridges extending in the direction of the second fluid stream 7. This allows the curvature of the curved laminated heat exchanger sections 10 to be taken up more easily through small angular distortions in the corrugations. The corrugated fins might have an approximately sinusoidal form as shown or may comprise a more angular profile.

The formations could, of course, take on any form, for example, they could comprise individual fin members or be provided by arrays of fins. The formations 9 may also be provided by a lattice structure or by a matrix having passages extending in the second flow direction 7.

Turning now to FIG. 3, a portion of an exemplary curved laminated heat exchanger section 10 is shown (the parts are shown schematically and are not to scale). The heat exchanger section 10 has opposed heat exchange surfaces 15, 16 which the second fluid stream 3 is arranged to flow over and extract heat from. The heat exchanger section 10 is curved in a direction normal to the second flow path (the y-direction) so that a first heat exchange surface 15 is convex and the second heat exchange surface 16 is concave.

Each of the laminated heat exchanger sections comprises a plurality of laminate members 20, 30, 40 that are curved and are stacked one on top of another. Each laminate member comprises a leading edge portion 21, 31, 41, which together form the leading edge 11 of the curved laminated heat exchanger section 10. The trailing edge 12 is provided by similar trailing edge portions 22, 32, 42. Pairs of laminate members 20, 40 are configured to provide a base and a cover for each channel through the provision of opposed hollowed regions 23, 43 formed in these laminate members. The hollowed regions may be prepared by removing material, such as during a stamping or etching process, or they may be created during fabrication of the laminate member, such as during a casting or printing process. Intermediate laminate members 30 may be provided between the laminate member pair 20, 40 to act as spacers, and these may be devoid of material in the region 33 between the leading edge and trailing edge portions 31, 32. Together, these edge portions 21, 22, 31, 32, 41, 42 and hollowed regions 23, 43 (and region 33) form a channel 17 of the first flow path 2.

In the embodiment shown in FIG. 3, the heat exchanger section 10 is provided with two channels 17 running in parallel between the heat exchange surfaces 15, 16, where each channel 17 is provided by four laminate members 20, 30, 40. There may of course be additional channels 17 and the respective flows may be in different directions. The channels 17 may be made from fewer or more laminate members 20, 30, 40, and the different channels 17 may be of different sizes or profiles. In one configuration the heat exchanger section may comprise more than one channel in the direction of the second flow path 7.

FIG. 4 is an example where the laminate members 20, 30, 40 additionally provide a manifold section 18, 19 at each side of the heat exchanger for distributing and collecting the first fluid stream to and from the channels 17.

Figure 5:
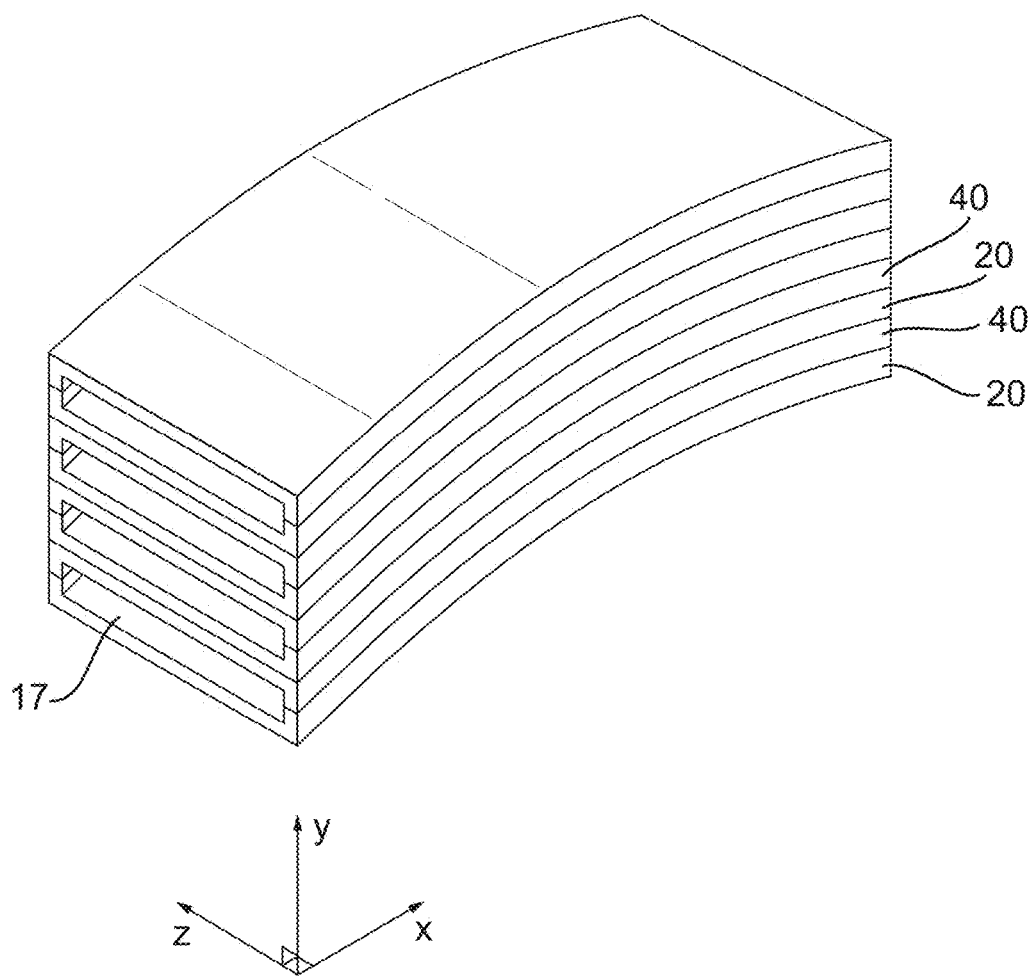

FIG. 5 shows a further example where pairs of laminate members 20, 40 are arranged, each facing the other of the pair, in order to define a channel 17. In the example, the heat exchanger section is provided with four pairs of laminate members 20, 40 which are stacked on top of each other to form four channels 17. Other arrangements of channels 17 are, of course, also possible.

Figure 6:
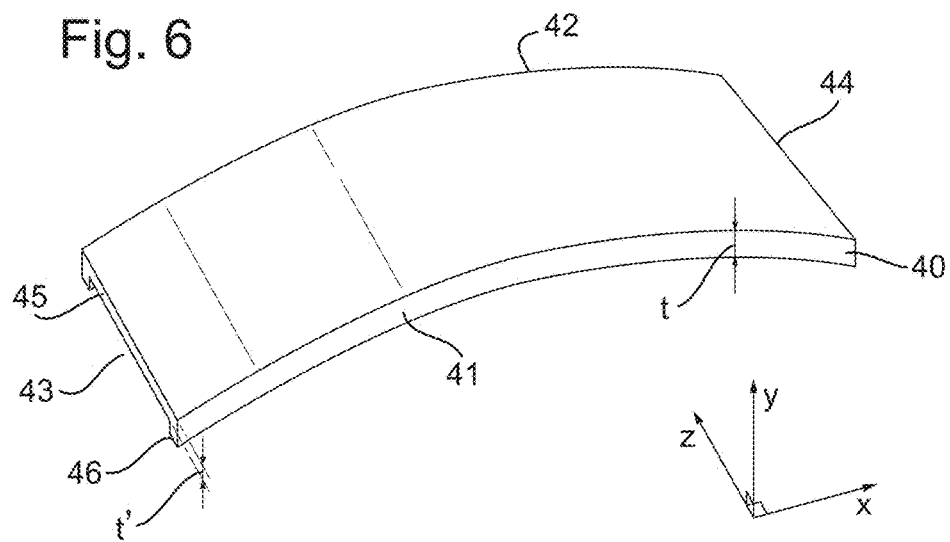
FIGS. 6 to 10 show examples of laminate members.
Figure 7:
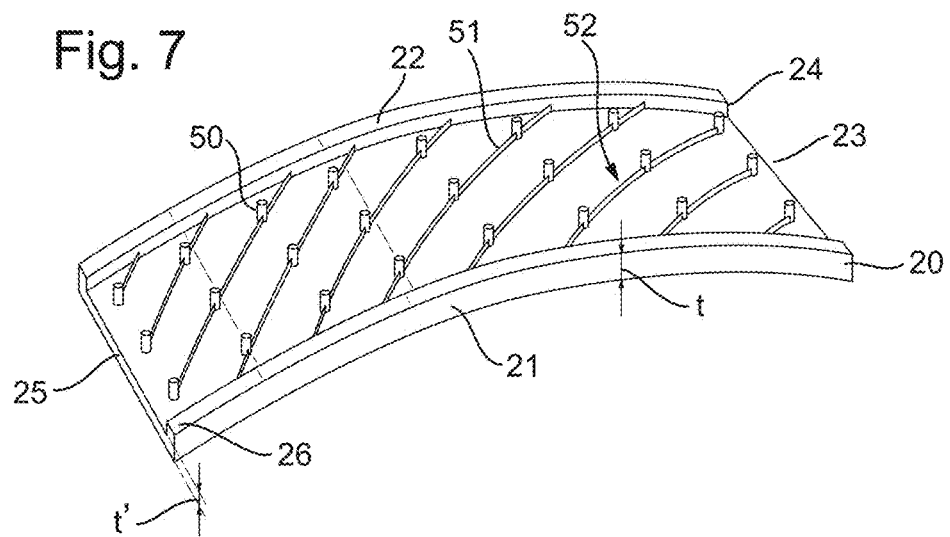
Figure 8:
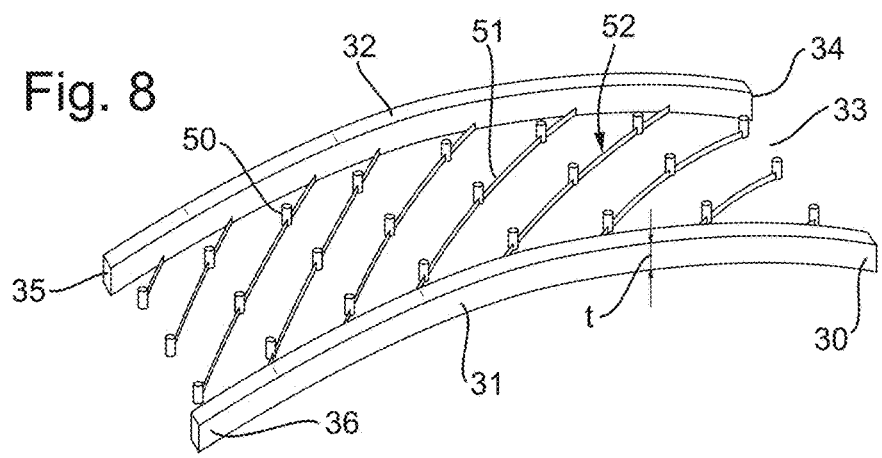

In FIGS. 6 to 8, examples of individual laminate members 20, 30, 40 are shown in more detail. FIG. 6 shows a laminate member 40 that forms a cover to a channel 17, FIG. 7 shows a laminate member 20 that provides a base to the channel 17 and FIG. 8 shows an intermediate laminate member 30 that can be used as a spacer.

The laminate members 20, 30, 40 may have the same thickness (t). Each laminate member 20, 30, 40 has a first end 24, 34, 44 for attachment to one side 4 of the cross-flow heat exchanger 1, and a second end 25, 35, 45 for attachment to the other side 5 of the cross-flow heat exchanger 1. The laminate members of FIGS. 6 and 7 provide the "pair" of laminate members 20, 40. Both of these comprise a hollowed region 23, 43 where the thickness of the laminate member 20, 40 is reduced (t'<t). The hollowed regions 23, 43 may be arranged substantially centrally in the laminate members 20, 40 as shown, extending through to the first and second ends 24, 25, 44, 45 of the laminate members 20, 40 in the direction of flow 6.

In FIGS. 6 and 7, the hollowed region 23, 43 further include heat transfer elements 50 that project from the hollowed regions (these are not visible in FIG. 6 because of the orientation of the laminate member 40). These heat transfer elements 50 may be in the form of pegs, which may be either free-standing or connected to a neighbouring heat transfer element 50 for support, and for optimising fluid and heat flow, by a ligament 51, in this way forming chains of heat transfer elements 52 that extend within the first flow path 2.

The heat transfer elements 50 on the pair of laminate members 20, 40 may have a height substantially equal to the difference between the thickness (t) of the laminate members 20, 40 and the thickness of the hollowed region (t').

FIG. 8 illustrates an intermediate laminate member 30 that can be positioned between the pair of laminate members 20, 40 of FIGS. 6 and 7. The central or 'hollowed' region 33 of the laminate member 30 has been removed (or is absent) to provide a void which forms part of the channel 17. The intermediate laminate member 30 can include a set of heat transfer elements 50, supported by ligament 51, that correspond in section and position to those in the hollowed regions 23, 43 of the pair of laminate members 20, 40. In this case, the heat transfer elements 50 may have a height substantially equal to the thickness (t) of the laminate member 30.

Thus, the plurality of channels 17 are formed by building up a set of selected laminate members 20, 30, 40, which are stacked one on top of the next in an aligned manner. Further, the heat transfer elements 50 of adjacent laminate members 20, 30, 40 may be aligned such that they are in contact with one another.

Figure 9:
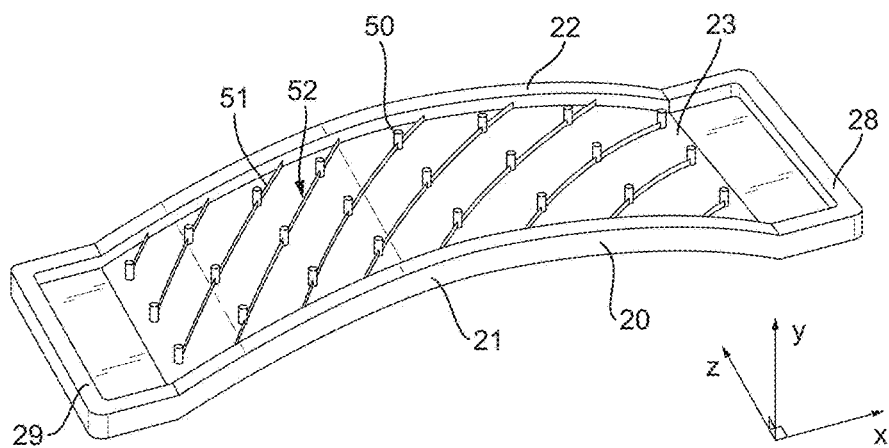
Figure 10:
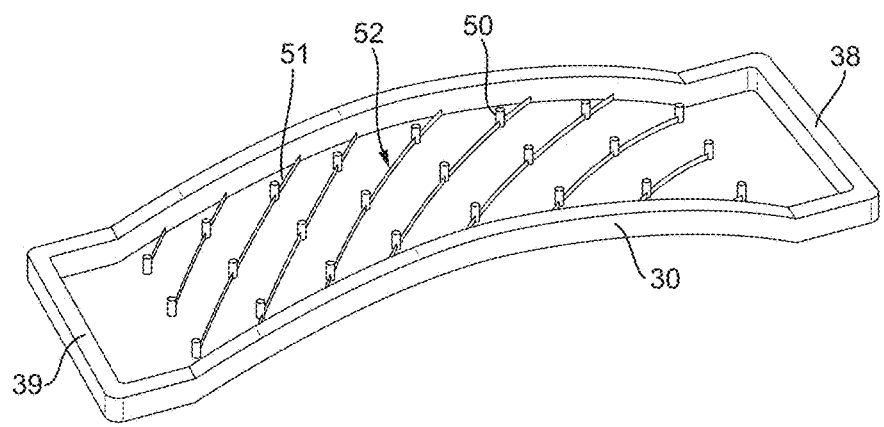

FIG. 9 shows an adaption of the laminate member 20 shown in FIG. 7 that is for use in the heat exchanger section 10 of FIG. 4. A frame 26 forming the leading edge and trailing edge portions 21, 22 is extended with manifold portions 28, 29 to define walls of the manifolds 18, 19 for the inlet and outlet respectively of the channel 17. As in FIG. 7, the laminate member 20 includes an array of heat transfer elements 50, which may be supported by ligaments 51, that extends across the hollowed region 23. FIG. 10 shows a corresponding intermediate laminate member 30 that can be placed on top of the laminate member of FIG. 9. It is provided with an array of heat transfer elements 50 supported by ligaments 51, that form chains of heat transfer elements 52. These would be arranged to align up with those of the base laminate member 20. Manifold portions 38, 39 also align with manifold portions 28, 29 to build up the manifolds 18, 19. A cover laminate member 40 (not shown, but substantially corresponding to a reverse of the base laminate member 20 of FIG. 9) would be provided to cover over the channel 17. This cover laminate member 40 would include a similar array of heat transfer elements and manifold portions as the other two laminate members 20, 30.

Further features of the disclosure, which may be combined with any of the previously discussed features, are given in the following numbered clause:

1. A cross-flow heat exchanger comprising a first flow path for a first fluid stream which is arranged substantially at right angles to a second flow path for a second fluid stream, wherein:
the first flow path is confined within two or more heat exchanger sections that bridge between opposite sides of the heat exchanger, the one or more heat exchanger sections having a leading edge positioned in the second flow path, the second flow path being defined, at least in part, by adjacent laminated heat exchanger sections.

The invention claimed is:

1. A curved cross-flow heat exchanger comprising a first flow path for a first fluid stream which is arranged substantially at right angles to a second flow path for a second fluid stream, wherein:
the first flow path is confined within one or more heat exchanger sections that bridge between opposite sides of the heat exchanger, the one or more heat exchanger sections having a leading edge positioned in the second flow path,
wherein each of the one or more heat exchanger sections is a curved laminated heat exchanger section and comprises a leading edge that is curved in a direction normal to the second flow path,
wherein each of the one or more heat exchanger sections comprises a plurality of laminate members that are stacked one on top of another and follow a curved profile, each comprising a leading edge portion such that the leading edge portions of the stacked laminate members form the leading edge of the curved laminated heat exchanger section, and wherein the stacked laminate members form two or more channels of the first flow path, and each channel comprises at least a pair of laminate members with opposed hollowed regions.

2. The heat exchanger as claimed in claim 1, wherein the laminate members comprise an array of heat transfer elements.

3. The heat exchanger as claimed in claim 1, comprising two or more curved laminated heat exchanger sections, the second flow path being defined, at least in part, by adjacent curved laminated heat exchanger sections.

4. The heat exchanger as claimed in claim 3, wherein the second flow path comprises formations extending between adjacent curved laminated heat exchanger sections.

5. The heat exchanger as claimed in claim 4, wherein the formations comprise corrugated fins.

6. The heat exchanger as claimed in claim 1, wherein the first fluid is a gas and the second fluid is a gas.

7. The heat exchanger as claimed in claim 1, wherein the first fluid is a liquid and the second fluid is a gas.

8. A method of manufacturing a curved cross-flow heat exchanger comprising a first flow path for a first fluid stream which is arranged substantially at right angles to a second flow path for a second fluid stream, the method comprising:
producing a plurality of laminate members;
assembling the plurality of laminate members into a stack to form a curved laminated heat exchanger section for the first fluid stream;
arranging the curved laminated heat exchanger section between opposite sides of the cross-flow heat exchanger to provide an assembly in which the curved laminated heat exchanger section comprises a leading edge curved in a direction normal to the second flow path; and
brazing the components to one another,
wherein each laminate member comprises a leading edge portion such that the leading edge portions of the stacked laminate members form the leading edge of the curved laminated heat exchanger section, and wherein the stacked laminate members form two or more channels of the first flow path, and each channel comprises at least a pair of laminate members with opposed hollowed regions.

9. The method as claimed in claim 8, further comprising alternately stacking a plurality of the curved laminated heat exchanger sections, with formations arranged in the second flow path.

10. The method as claimed in claim 9, comprising brazing the stack of laminate members to one another prior to brazing the curved laminated heat exchanger sections to the heat exchange member.

11. The method as claimed in claim 9, comprising brazing the stack of laminate members to one another and brazing the curved laminated heat exchanger sections to the formations during the same brazing step.

12. The method as claimed in claim 8, wherein the brazing is vacuum brazing.

13. The method as claimed in claim 8, wherein the formations of the second flow path are conformed to the curvature of the curved laminated heat exchanger section during the assembly of the curved cross-flow heat exchanger.

* * * * *